United States Patent
Liu et al.

(10) Patent No.: US 12,265,807 B2
(45) Date of Patent: Apr. 1, 2025

(54) CONTROL FLOW AUTO-VECTORIZATION USING RUN-TIME CHECKS AND COMPILE-TIME ANALYSIS

(71) Applicant: International Business Machines Corporation, Armonk, NY (US)

(72) Inventors: Bangtian Liu, Toronto (CA); Avery Laird, Toronto (CA); Wai Hung Tsang, Markham (CA); Bardia Mahjour, Newmarket (CA); Maryam Dehnavi, Toronto (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 232 days.

(21) Appl. No.: 18/192,878

(22) Filed: Mar. 30, 2023

(65) Prior Publication Data
US 2024/0329957 A1 Oct. 3, 2024

(51) Int. Cl.
*G06F 9/44* (2018.01)
*G06F 8/41* (2018.01)

(52) U.S. Cl.
CPC .............. *G06F 8/452* (2013.01); *G06F 8/433* (2013.01)

(58) Field of Classification Search
CPC .... G06F 9/30058; G06F 8/452; G06F 9/3888; G06F 8/41; G06F 8/443; G06F 9/38885; G06F 9/3009; G06F 8/451; G06F 9/3822
See application file for complete search history.

(56) References Cited

U.S. PATENT DOCUMENTS

| 8,381,203 B1 * | 2/2013 | Beylin | G06F 9/3851 717/149 |
| 2012/0079466 A1 | 3/2012 | Gonion | |

(Continued)

FOREIGN PATENT DOCUMENTS

| CN | 103440229 B | 8/2013 | |
| WO | WO-2024228961 A1 * | 11/2024 | G06F 8/41 |

OTHER PUBLICATIONS

Sun, H., et al., "WCCV: Improving the Vectorization of IF-Statements with Warp-Coherent Conditions", Proceedings of the ACM International Conference on Supercomputing (Phoenix, Arizona) (ICS 2019), pp. 319-329.

(Continued)

*Primary Examiner* — Chuck O Kendall
(74) *Attorney, Agent, or Firm* — Eric Chesley, Esq.; Matthew M. Hulihan, Esq.; Heslin Rothenberg Farley & Mesiti P.C.

(57) ABSTRACT

Vectorization of program code by way of a method that includes obtaining program code to be compiled. The program code has a loop that includes a control-flow having divergent branch conditions. The method includes compiling the program code to produce compiled code. The compiling includes performing compile-time analysis of the loop based on an assumption of dynamic uniformity, and determining from the analysis a vectorizable access pattern of the loop. The compiling also includes vectorizing the loop as part of the compiling the program code, including compiling the loop. The vectorizing includes providing run-time checks in the compiled code. The run-time checks are configured for checking for dynamically uniform conditions for vector processing at run-time to control program execution flow based on a result of the checking. The method also includes outputting the compiled code for execution.

20 Claims, 11 Drawing Sheets

(56) References Cited

U.S. PATENT DOCUMENTS

| | | |
|---|---|---|
| 2012/0167069 A1 | 6/2012 | Lin |
| 2014/0215183 A1* | 7/2014 | Yazdani ............. G06F 9/38873 712/24 |
| 2016/0170725 A1* | 6/2016 | Holton .................... G06F 8/451 717/157 |
| 2017/0286076 A1 | 10/2017 | De et al. |

OTHER PUBLICATIONS

Shin, J., et al., "Evaluating Compiler Technology for Control-Flow Optimizations for Multimedia Extension Architectures", Microprocess, Microsyst. 33, 4 (Jun. 2009), pp. 235-243.

Sujon, M., et al., "Vectorization Past Dependent Branches Through Speculation", Proceedings of the 22nd International Conference on Parallel Architectures and Compilation Techniques (Edinburgh, Scotland, UK) (PACT 2013). IEEE Press, pp. 353-362.

Baghsorkhi, S., et al., "FlexVec: Auto-Vectorization for Irregular Loops", ACM SIGPLAN Notices 51 (Jun. 2016), Issue 6, pp. 697-710.

Moll, S., et al., "Partial Control-Flow Linearization", Proceedings of the 39th ACM SIGPLAN Conference on Programming Language Design and Implementation (Philadelphia, Pa, USA) (PLDI 2018). Association for Computing Machinery, pp. 543-556.

Allen, J.R., et al., "Conversion of Control Dependence to Data Dependence". In Proceedings of the 10th ACM SIGACT-SIGPLAN Symposium on Principles of Programming Languages (Austin, Texas) (POPL 1983). Association for Computing Machinery, pp. 177-189. https://doi.org/10.1145/567067.567085.

Bachmann, O., et al., "Chains of Recurrences—a Method to Expedite the Evaluation of Closed-Form Functions". In Proceedings of the International Symposium on Symbolic and Algebraic Computation (Oxford, United Kingdom) (ISSAC 1994). Association for Computing Machinery, pp. 242-249. https://doi.org/10.1145/190347.190423.

Park, Jr., et al., "On Predicated Execution". Hewlett-Packard Company, 1991 (26 pgs.).

Cytron, R., et al., "Efficiently Computing Static Single Assignment Form and the Control Dependence Graph". ACM Trans. Program. Lang. Syst. 13, 4 (Oct. 1991), pp. 451-490. https://doi.org/10.1145/115372.115320.

Ferrante, Jr., et al., "The Program Dependence Graph and Its Use in Optimization". ACM Trans. Program. Lang. Syst. 9, 3 (Jul. 1987), pp. 319-349. https://doi.org/10.1145/24039.24041.

Agner Fog. 2022. Lists of instruction latencies, throughputs and micro-operation breakdowns for Intel, AMD, and VIA CPUs. https://www.agner.org/optimize/instruction_tables.pdf (469 pgs.).

Gupta, R., et al., "Profile Guided Compiler Optimizations". In The Compiler Design Handbook: Optimizations and Machine Code generation. CRC Press, 2002, 36 pgs.

Kim, Seonggun, et al., "Efficient SIMD code generation for irregular kernels". In Proceedings of the 17th ACM SIGPLAN Symposium on Principles and Practice of Parallel Programming. 2012, pp. 55-64.

Kuck, D. J., et al., "Dependence Graphs and Compiler Optimizations". In Proceedings of the 8th ACM SIGPLAN-SIGACT Symposium on Principles of Programming Languages (Williamsburg, Virginia) (POPL 1981). Association for Computing Machinery, pp. 207-218. https://doi.org/10.1145/567532.567555.

Larsen, S., et al., "Exploiting Superword Level Parallelism with Multimedia Instruction Sets". In Proceedings of the ACM SIGPLAN 2000 Conference on Programming Language Design and Implementation (Vancouver, British Columbia, Canada) (PLDI 2000). Association for Computing Machinery, pp. 145-156. https://doi.org/10.1145/349299.349320.

Lee, Y, et al., "Exploring the design space of SPMD divergence management on data-parallel architectures". 47th Annual IEEE/ACM International Symposium on Microarchitecture. IEEE, 2014, pp. 101-113.

Maleki, S. et al., "An evaluation of vectorizing compilers". International Conference on Parallel Architectures and Compilation Techniques. IEEE, 2001, pp. 372-382.

Mendis, C., et al., "Revec: program rejuvenation through revectorization". Proceedings of the 28th International Conference on Compiler Construction. 2019, pp. 29-41.

Pohl, A., et al., "Control Flow Vectorization for ARM NEON". Proceedings of the 21st International Workshop on Software and Compilers for Embedded Systems (Sankt Goar, Germany) (SCOPES 2018). Association for Computing Machinery, pp. 66-75. https://doi.org/10.1145/3207719.3207721.

Shin, J., "Introducing Control Flow into Vectorized Code". Proceedings of the 16th International Conference on Parallel Architecture and Compilation Techniques (PACT 2007). IEEE Computer Society, pp. 280-291.

Breraman, N., et al., "A Vectorizing Compiler for Multimedia Extensions". International Journal of Parallel Programming 28 (2000), pp. 363-400.

Van Engelen, R., "Efficient Symbolic Analysis for Optimizing Compilers", Compiler Construction, Reinhard Wilhelm (Ed.). Springer Berlin Heidelberg, Berlin, Heidelberg, 2001, pp. 118-132.

Zhou, H., et al., "A compiler approach for exploiting partial SIMD parallelism". ACM Transactions on Architecture and Code Optimization (TACO) 13, 1 (2016), pp. 1-26.

Grace Period Disclosure: Liu, B., et al., "Combining Run-time Checks and Compile-time Analysis to Improve Control Flow Auto-Vectorization", May 27, 2022, 12 pgs.

Coutinho, B., et al., "Divergence Analysis and Optimizations". International Conference on Parallel Architectures and Compilation Techniques. 2011, pp. 320-329. https://doi.org/10.1109/PACT.2011.63.

Doerfert, J., et al., "Optimistic loop optimization". CGO 2017—Proceedings of the 2017 International Symposium on Code Generation and Optimization (2017), pp. 292-304. https://doi.org/10.1109/CGO.2017.7863748.

Karrenberg, R., et al., "Whole-Function Vectorization". Proceedings of the 9th Annual IEEE/ACM International Symposium on Code Generation and Optimization (CGO 2011). IEEE Computer Society, pp. 141-150.

Lattner, C., et al., "LLVM: A compilation framework for lifelong program analysis & transformation". International Symposium on Code Generation and Optimization, 2004. CGO 2004. IEEE, pp. 75-86 (12 pgs.).

Lee, Y., et al., "Convergence and scalarization for data-parallel architectures". Proceedings of the 2013 IEEE/ACM International Symposium on Code Generation and Optimization (CGO), pp. 1-11 https://doi.org/10.1109/CGO.2013.6494995.

Praharenka, W., et al., "Vectorizing divergent control flow with active-lane consolidation on long-vector architectures". The Journal of Supercomputing 78, 0 (2022), pp. 12553-12588 (36 pgs.).

LLVM Project. 2022. llvm::BranchProbabilityInfo Class Reference. https://llvm.org/doxygen/classllvm_1_1BranchProbabilityInfo.html, 9 pgs.

LLVM Project. 2022. Vectorization Plan. https://llvm.org/docs/Proposals/VectorizationPlan.html, 4 pgs.

Sampaio, D., et al., "Simplification and Runtime Resolution of Data Dependence Constraints for Loop Transformations". Proceedings of the International Conference on Supercomputing (Chicago, Illinois) (ICS 2017). Association for Computing Machinery, Article 10, 11 pgs. https://doi.org/10.1145/3079079.3079098.

Shin, J., et al., "Superword-Level Parallelism in the Presence of Control Flow". Proceedings of the International Symposium on Code Generation and Optimization (CGO 2005). IEEE Computer Society, pp. 165-175 (11 pgs.) https://doi.org/10.1109/CGO.2005.33.

Stephens, N., et al., "The ARM scalable vector extension". IEEE micro 37, 2 (2017), pp. 26-39 (14 pgs.).

\* cited by examiner

```
for (int i=0; i<n; ++i)
    if (cond[i])
        b[i] = a[i] + b[i];
    else {
        j++;
        d[j] = c[i] * b[i];
    };
```

FIG. 2A

```
for (int i=0; i<n/2*2; i+=2) {
    cond_v = <cond[i], cond[i+1]>;
    v_b = v_load(&b[i]);
    if (all(cond_v)) {
        v_a = v_load(&a[i]);
        v_store(&b[i], v_a + v_b);
    } else if (none(cond_v)) {
        v_c = v_load(&c[i]);
        v_d = v_c * v_b;
        j++;
        v_store(&d[j], v_d);
        j++;
    } else {  /* Divergent path. */ }
}
```

FIG. 2B

```
for (int i=0; i<n; ++i)
    if (b[i] < 0)
        c[i+1] = c[i];
```

FIG. 4A

```
for (int i=0; i<n; ++i)
    m = c[i];
    if (b[i] < 0) {
        c[i+1] = m;
        a[i] = b[i];
    }
```

FIG. 4B

```
for (int i=0; i<n; ++i)
    if (b[i] < 0)
        a[i] = c[i];
    else
        c[i+1] = a[i];
```

FIG. 4C

```
for (int i=0; i<n/2*2; i+=2) {
    v_mask = {b[i]<0, b[i+1]<0};
    if (all(v_mask)) {
        c[i+1] = c[i];
        c[i+2] = c[i+1];
    } else if (none(v_mask)) { }
    else { /* divergent path */ }
}
```

FIG. 4G

```
for (int i=0; i<n/2*2; i+=2) {
    v_mask = {0, 0};
    m0 = c[i];
    if (b[i]<0) {c[i+1] = m0; v_mask[0] = 1;}
    m1 = c[i+1];
    if (b[i+1]<0) {c[i+2] = m1; v_mask[1] = 1;}
    if (all(v_mask))
        v_store(&a[i], v_load(&b[i]));
    else if (none(v_mask)) { }
    else { /* divergent path */ }
}
```

FIG. 4H

```
for (int i=0; i<n/2*2; i+=2) {
    v_mask = {b[i] < 0, b[i+1] < 0};
    if (all(v_mask))
        v_store(&a[i], v_load(&c[i]));
    else if (none(v_mask))
        v_store(&c[i+1], v_set(0));
    else { /* divergent path */ }
}
```

FIG. 4I

CONTROL FLOW AUTO-VECTORIZATION USING RUN-TIME CHECKS AND COMPILE-TIME ANALYSIS

STATEMENT REGARDING PRIOR DISCLOSURES BY THE INVENTOR OR A JOINT INVENTOR

The following disclosure(s) are submitted under 35 U.S.C. 102 (b)(1)(A):
Bangtian Liu et al., "Combining Run-Time Checks and Compile-Time Analysis to Improve Control Flow Auto-Vectorization", PACT '22: Proceedings of the International Conference on Parallel Architectures and Compilation Techniques, October 2022, pages 439-450 (published 27 Jan. 2023).

BACKGROUND

Single Instruction Multiple Data (SIMD) instructions improve the performance of parallel operations by applying the same operation to multiple elements simultaneously (this is also referred to as 'vectorization'). Under SIMD processing, each such element is processed in parallel along a respective SIMD lane. The number of SIMD lanes, which can be referred to a "vectorization factor", "SIMD width" or "vector width", is therefore the number elements on which the operation can be parallel performed simultaneously. Well-known compilers can use loop vectorization and/or other parallelism to take advantage of SIMD instructions.

SUMMARY

Shortcomings of the prior art are overcome and additional advantages are provided through the provision of a computer-implemented method. The method obtains program code to be compiled. The program code includes a loop, and the loop includes control-flow having divergent branch conditions. The method also compiles the program code to produce compiled code. The compiling includes performing compile-time analysis of the loop based on an assumption of dynamic uniformity, and determining from the compile-time analysis a vectorizable access pattern of the loop. The compiling also includes vectorizing the loop as part of the compiling the program code, including compiling the loop. The vectorizing includes providing run-time checks in the compiled code. The run-time checks are configured for checking for dynamically uniform conditions for vector processing at run-time to control program execution flow based on a result of the checking. The method additionally outputs the compiled code for execution.

Additional aspects of the present disclosure are directed to systems and computer program products configured to perform the methods described above. The present summary is not intended to illustrate each aspect of, every implementation of, and/or every embodiment of the present disclosure. Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

FIGS. 2A-2B depict an example in which initial program code has been vectorized in accordance with aspects described herein;
FIGS. 4A-4I depict example loops with different control-dependent cross-iteration dependencies, corresponding control flow graphs, and auto-vectorizations of each such loop with run-time checks, in accordance with aspects described herein.

DETAILED DESCRIPTION

Figure 1:
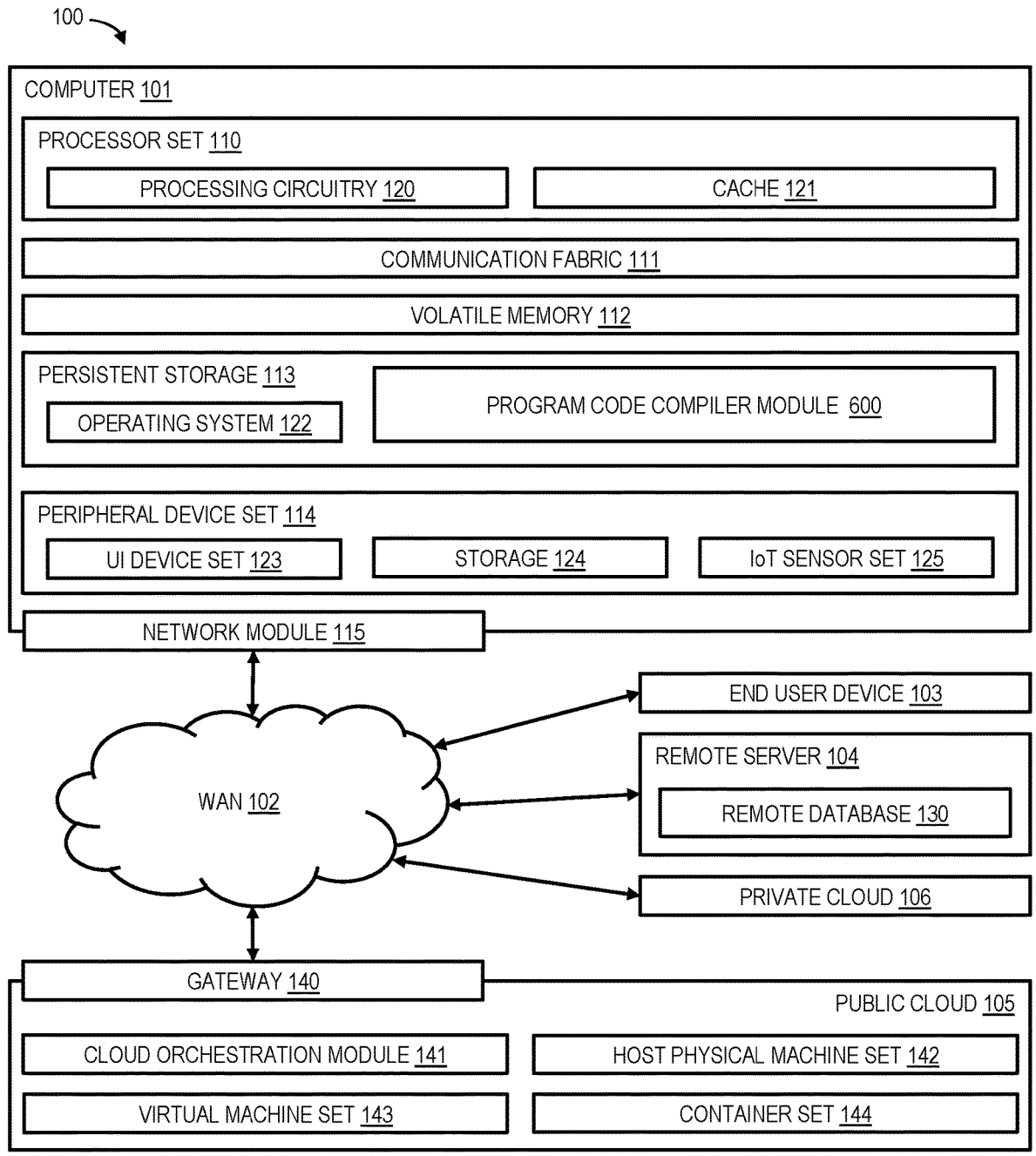
FIG. 1 depicts an example computing environment to incorporate and/or use aspects described herein.

Described herein are approaches for improved control flow auto-vectorization of program code to be compiled. This is facilitated, in embodiments, though a combination of compile-time analysis and run-time checks imparted in compiled code for performance during program. While vectorization can provide performance improvement, control flow in the program code, for instance if-statements, can cause vectorization techniques to generate inefficient code because it is unknown at compile-time which control path(s) will execute. Additionally, if a data dependency exists, then conventional loop auto-vectorization is disabled entirely.

If-conversion allows loops with control flow to be vectorized and, while control flow is typically auto-vectorized using this approach, it has two major downsides. First, software predication has overhead. Second, if the condition of the branch is often false during run-time, then most SIMD lanes will be unused, which results in under-utilization of the SIMD unit. Similarly, if the branch condition is often true, then all lanes might frequently be active, obviating the need for software predication. A branch is said to be 'uniform' when static analysis can determine that a condition has the same value for all SIMD lanes. The term "dynamic uniformity" is used herein to describe the case when uniformity (such as a true condition for each SIMD lane in an iteration or a false condition for each SIMD lane in an iteration) occurs at run-time but cannot be proven statically. In other words, a dynamic uniformity condition is a scenario in which the branch condition for each of the elements in the vector is the same (e.g., all true or all false).

An auto-vectorizer with run-time checks is proposed herein as a compile-technique that uses run-time checks to test for dynamically uniform control flows. Thus, some aspects described herein operate at compile time when the subject program code is compiled. Run-time checks can be imparted for control flow within a loop. In connection with this, aspects described herein can draw conclusions about uniformity of the iteration space of a loop. If-then-else statements within the loop can be added to check for dynamic uniformity. Under a condition of dynamic uniformity, certain assumptions can be made that. Examples are described below with reference to FIGS. 2 and 4. In general, the run-time checks can check for uniformity and direct processing accordingly to paths dictated from compile-time analysis of the program code when compiling. The actual path to take can be determined only at run-time, hence the insertion of these controls as run-time checks.

Under the assumption of dynamic uniformity, compile-time analyses are performed that improve control flow auto-vectorization in comparison to conventional approaches. The auto-vectorizer with run-time checks leverages dynamic uniformity to vectorize loops, including those with control-dependent cross-iteration dependencies, and without the overhead of speculation. Aspects also enhance existing scalar evolution techniques to recognize contiguous access patterns within a dynamically uniform subset of the iteration space of a loop in order to enable vectorization. Aspects can also employ a probability-based cost model that considers an execution profile of the program code, in order to predict the profitability of run-time checks and auto-vectorization in accordance with aspects described herein.

One or more embodiments described herein may be incorporated in, performed by and/or used by a computing environment, such as computing environment 100 of FIG. 1. As examples, a computing environment may be of various architecture(s) and of various type(s), including, but not limited to: personal computing, client-server, distributed, virtual, emulated, partitioned, non-partitioned, cloud-based, quantum, grid, time-sharing, cluster, peer-to-peer, mobile, having one node or multiple nodes, having one processor or multiple processors, and/or any other type of environment and/or configuration, etc. that is capable of executing process(es) that perform any combination of one or more aspects described herein. Therefore, aspects described and claimed herein are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing aspects of the present disclosure, such as code of program code compiler module 600. In addition to block 600, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 600, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 121 and the other storage media discussed below. The program instructions, and associated data, are accessed by processor set 110 to control and direct performance of the disclosed methods. In computing environment 100, at least some of the instructions for performing the disclosed methods may be stored in block 600 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 600 typically includes at least some of the computer code involved in performing the disclosed methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the disclosed methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above in FIG. 1 is only one example of a computing environment to incorporate, perform, and/or use aspect(s) of the present disclosure. Other examples are possible. For instance, in one or more embodiments, one or more of the components/modules of FIG. 1 are not included in the computing environment and/or are not used for one or more aspects of the present disclosure. Further, in one or more embodiments, additional and/or other components/modules may be used. Other variations are possible.

As noted, provided herein are approaches for improved control flow auto-vectorization. One aspect provides analysis of control dependent cross iteration dependencies. Much existing work on vectorization of conditionally executed code fails to properly consider cross iteration dependencies, instead resorting to over-pessimistic assumptions and withdrawal from vectorization opportunities. Approaches that do consider cross iteration dependencies either depend on hardware instructions or potentially expensive speculative execution to detect when dependencies are violated at runtime.

Auto-vectorization with run-time checks as described herein combines dynamic uniformity guarantees with dependence analysis at compile time to break certain dependency cycles that inhibit vectorization. FIG. 4C (described further below) provides an example of a loop that has cross iteration control dependency but, under conventional practice, is not considered vectorizable in current compilers. Aspects described herein can identify and break up the dependence cycle, enabling vectorization under uniformity guarantees.

Another aspect described herein provides static access pattern analysis based on runtime uniformity. Access pattern information in a loop (i.e., whether memory accesses in consecutive iterations of a loop are contiguous or have a short fix stride), can be important in enabling vectorization. However, existing approaches fail to enable vectorization based on contiguity or strides of access functions in a loop that depend on control-dependent execution of a scalar update. In contrast, aspects described herein combine dynamic uniformity guarantees with scalar evolution analysis at compile time to detect vectorizable access patterns. For example, as explained relative to the example of FIG. 2A, a scalar update (i.e., to j) and the subsequent access (i.e., d[j]) is recognized as a contiguous access pattern (despite the update, j++, being executed conditionally) for a subset of the loop's iteration space under uniformity guarantee, and therefore the compiler can conditionally vectorize the instructions in the subject else branch.

An additional aspect employs a cost model. Accurate profitability determination can be important to achieve good performance. Profitability of auto-vectorizing loops with control flow depends on many factors including the overhead cost of runtime checks and the benefit of vectorizing uniform branches. Aspects provide a cost-model that predicts the most profitable strategy for auto-vectorizing using a probability-based approach, without requiring expensive tuning or special-purpose profiling information, and, in embodiments, relying on generic profiling information ('PGO') or estimated block frequency information, for instance. In this manner, profile guided information from previously executing the program code is used by the cost model in determining whether it is profitable to apply auto-vectorization optimizations as described herein. The run-time checks carry some overhead in their performance.

It is desired to determine whether the benefit of running the optimized (vectorized) code will overcome the overhead of running the run-time checks.

The example of FIGS. 2A-2B, providing input/initial program code (FIG. 2A) and vectorized program code (FIG. 2B), is referred to in order to aid in the explanation of aspects presented herein. FIG. 2A provides a snippet of program code, specifically a 'for' loop, that may be received as part of a larger set of program code for compilation. The loop includes control flow and a control-dependent data dependency. Aspects described herein can compile this loop into binary code and vectorize the loop as part of that compilation, employing control-flow with dynamic uniformity. The loop example of FIG. 2A 1a contains a branch whose condition depends on the elements of the cond[ ] array. FIG. 2B presents an example program code showing this vectorization, in which both uniform control-paths (all(cond_v) and none(cond_v)) have been vectorized through run-time techniques combined with compile-time analyses. In this example, the vector width is 2 and i increments by 2 at each iteration of the for loop. Whether increased performance is realized in the execution of the compiled vectorized code is based on the particular input data when executing. For instance, take the example in which the six-element cond[ ] array at the time of executing the for loop is [0, 0, 1, 1, 0, 1]. The values stored in cond[ ] result in two instances of dynamic uniformity under this example—elements 0 and 1 are both '0' and all lanes will be inactive (uniform-false). Elements 2 and 3 are both '1' and all lanes will be active (uniform-true). Elements 4 and 5 have different values and therefore no uniformity exists (corresponding to the divergent path). FIG. 2B shows the loop of FIG. 2A the auto-vectorization with run-time checks under dynamic uniformity technique. Scalar evolution analysis (described below) recognizes that the j++ of FIG. 2A can be described as a chain of recurrences under uniformity and uses this insight to vectorize the store to d (shown in FIG. 2B). In FIG. 2B, the two statements—'if (all (cond_v))' and 'else if (none (cond_v))' are run-time checks for dynamic uniformity. That is, 'if (all (cond_v))' will check whether condition is true for all elements in the vector, and, if so, compete the vectorized store to b[ ]. Similar, the 'else if none (cond_v))' will check whether the condition is not true for all elements in the vector (i.e., false for every element), and, if so, completes the increment to j and store to d [ ]. Otherwise, the divergent path (no uniformity) is taken.

Accordingly, a process can obtain program code to be compiled, where the program code includes a loop—perhaps multiple loops. The loop includes control-flow having divergent branch conditions (and optional control-dependent cross-iteration dependencies). The process can also compile the program code to produce compiled code as described herein. In execution, dynamic uniformity information can be obtained by checking the branch conditions of control-flow at run-time. The compiling includes performing compile-time analysis of the loop based on an assumption of dynamic uniformity, and determining from the compile-time analysis a vectorizable access pattern of the loop. This is referred to herein as uniformity-based analysis (see, e.g., FIG. 3). This compile-time analysis includes a dependence analysis and a scalar evolution analysis, both under the assumption of dynamic uniformity. Though the analysis can identify at least one vectorizable access pattern, whether to actually vectorize the loop can be based on applying a cost model that takes an execution profile as input to determine the profitability of run-time checks and control-flow vectoriza-tion. A determination can therefore be made, using the cost model, and based on results of the compile-time analysis and based further on an input execution profile of the program code, whether to vectorize the loop. Assuming the cost model identifies that the loop should be vectorized, then the process can vectorize the loop as part of the compiling the program code, which includes compiling the loop. The vectorization includes providing run-time checks in the compiled code, the run-time checks being configured for checking for dynamically (i.e., at run-time) uniform conditions for vector processing to control program execution flow based on a result of the checking. Finally, the vector code (either vectorized through if-conversion or with run-time checks, for instance) or scalar code that is generated based on decisions from the cost model is output.

Figure 3:
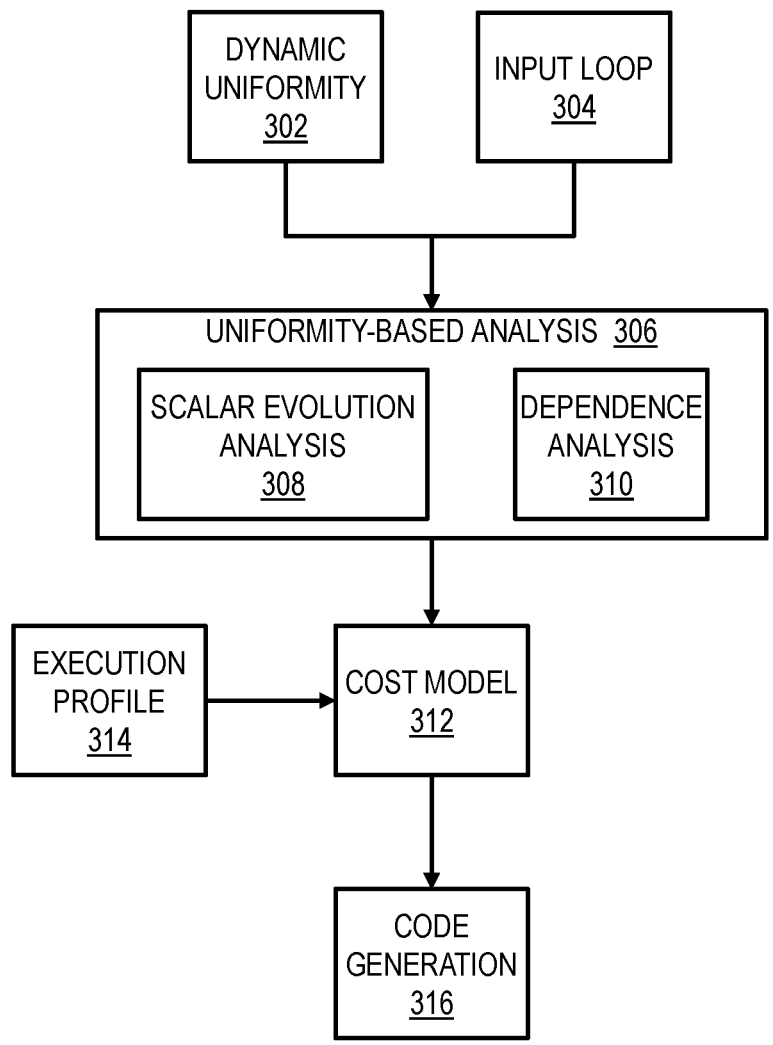
FIG. 3 depicts an example conceptual flow of program code compilation in accordance with aspects described herein.

FIG. 3 depicts an example conceptual flow of program code compilation in accordance with aspects described herein. The flow takes as inputs a loop 304 and dynamic uniformity information 302 (assumptions regarding all lanes active or inactive) to apply uniformity-based analysis 306, i.e., as scalar evolution analysis 308 and dependence analysis 310, and additionally takes profiling information 314 as an input determines using the cost model 312 the most profitable decision for control-flow vectorization. This flow can be proceeded through at compile time relative to a given input loop to generate a binary (at code generation 316), although whether the input loop is actually vectorized can depend on the result of the cost model.

It is noted that any given input loop may be part of a larger codebase that contains potentially more than one loop. Each such loop can be handled independently of the handling of other loops. Thus, in situations where the program code includes one or more additional loops, a process can repeat, for each such additional loop based on input thereof with dynamic uniformity information, the compile-time analysis of the loop based on the assumption of dynamic uniformity, and the application of the cost model to determine whether to vectorize the loop. Each loop can therefore be selectively either vectorized or not vectorized, independent of whether any other loop of the program code is vectorized.

The uniformity-based analysis (306) includes dependence analysis (310) based on dynamic uniformity. Aspects utilize dynamic uniformity information (assuming all lanes active or inactive) to perform dependence analysis and support control-dependent cross-iteration dependencies. In examples, dependence analysis under the assumption of dynamic uniformity identifies a control-dependent cross-iteration dependence as part of a strongly connected component (SCC) and also identified a category of the control-dependent cross-iteration dependence Three categories of control-dependent cross-iteration dependency are identified (as demonstrated in FIGS. 4A-4I described below) that are analyzable through the property of uniformity: (i) an intra-predicated dependence, (ii) a partially-predicated dependence, and (iii) an inter-predicated dependence. The vectorizing of the loop selects which instructions of the loop to vectorize based on the identified category of the control-dependent cross-iteration dependence, as described further below.

Figure 4D:
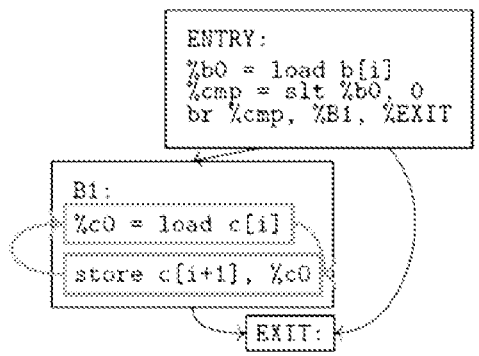
Figure 4E:
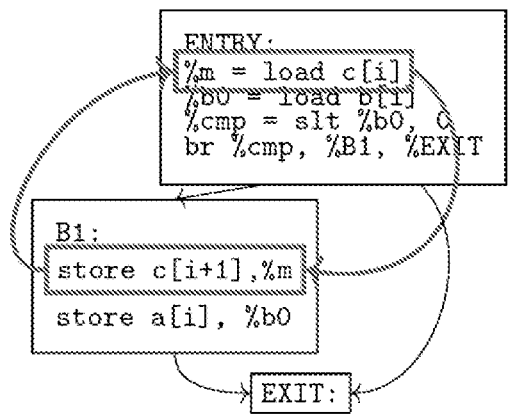
Figure 4F:
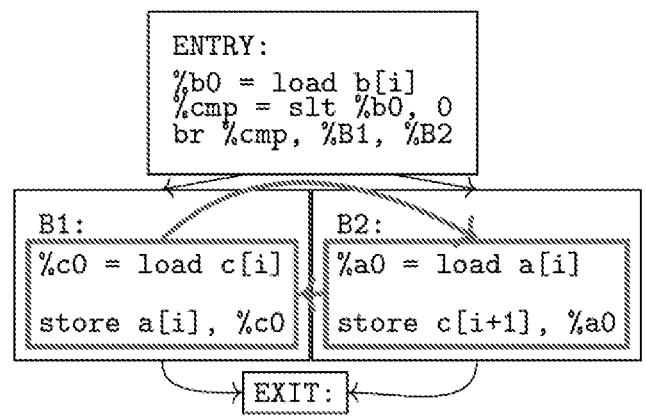

Referring now to FIGS. 4A-4I, depicted are three example initial loops (FIGS. 4A, 4B, 4C) of a respective three control-dependent cross-iteration dependencies. FIG. 4A depicts a loop exhibiting an intra-predicated dependence, FIG. 4B depicts a loop exhibiting a partially-predicated dependence, and FIG. 4C depicts a loop exhibiting an inter-predicated dependence. FIGS. 4D, 4E, and 4F depict, respectively, the control flow graphs (CFG) for the loops of FIGS. 4A, 4B, and 4C. FIGS. 4G, 4H, and 4I depict the corresponding loops after applying the auto-vectorizing with run-time checks to each initial loop FIG. 4A, FIG. 4B, and FIG. 4C, respectively. By cross-iteration is meant that the data accessed in one iteration is accessed in another subsequent iteration. A control dependency refers to the execution of a certain access depending on a condition that was evaluated prior. In FIG. 4C, the value that is written in the 'else' path (i.e., c[i+1]) is the same value that might be read on the next iteration, i.e., under the 'if' path.

Cross-iteration dependencies appear as part of strongly connected components (SCC) within the data dependence graph (DDG) that prevent vectorization. Aspects described herein can use the DDG implemented in a compiler to determine the category of control-dependent cross-iteration dependency by analyzing how it is affected by control flow. Each example shown by FIG. 4A, 4B, 4C contains a dependency cycle (as shown by FIGS. 4D, 4E and 4F) indicating a SCC that directly disables if-conversion and vectorization.

Intra-Predicated Dependency: FIG. 4A shows an example of intra-predicated dependency, where the SCC occurs only within a predicated block (see the corresponding CFG of FIG. 4D). In the uniform-true case, instructions involved in the SCC and in the control-dependent block are guaranteed to be executed exactly once for every SIMD lane, and can be directly scalarized in order (as shown by FIG. 4G, the version vectorized according to aspects described herein). Any instructions in the uniform-true path that are not a part of the SCC will be vectorized without predication because they are data-parallel and all lanes are active (as shown in the example FIG. 2B).

Partially-Predicated Dependency: FIG. 4B shows an example of partially-predicated dependency, where the SCC must contain instructions that are in two types of blocks: (i) blocks that are control-dependent on the same block t, and (ii) blocks that are not control-dependent on t. In this case, the SCC contains a mixture of control-dependent and non-control-dependent instructions. All instructions involved in the SCC are collected and unrolled in order together such that data-dependence relationships are preserved. Control-dependent instructions are unrolled such that each instance is guarded by the branch instruction they depend on, and control-dependence is not violated (as shown by FIG. 4H). Because this branch instruction must also define the block predicate, each unrolled branch instance also computes the block predicate value for the corresponding lane. As part of vectorization, the process inserts run-time checks to test whether the block predicate is uniform-true (all lanes are active) or uniform-false (all lanes are inactive). Any instructions not involved in the dependency cycle will be directly vectorized without predication, for example, the stores and loads on arrays a and b.

Inter-Predicated Dependency: FIG. 4C shows an example of the inter-predicated dependency case, where the SCC must contain instructions from blocks on different control-paths, and all blocks are control-dependent on the same block. Control-dependent blocks on different control-paths are mutually exclusive; one control-path or the other control-path, but not both, will execute for each iteration. Therefore, the uniform paths are also mutually exclusive. Any reads or writes that occur in different paths cannot affect instructions between iterations of the SIMD width (in these examples it is 2), and therefore instructions in the uniform branches no longer form an SCC and can be vectorized safely. However, instructions in the divergent path (as shown FIG. 4I) are still contained in an SCC and are scalarized in order.

Figure 5A:
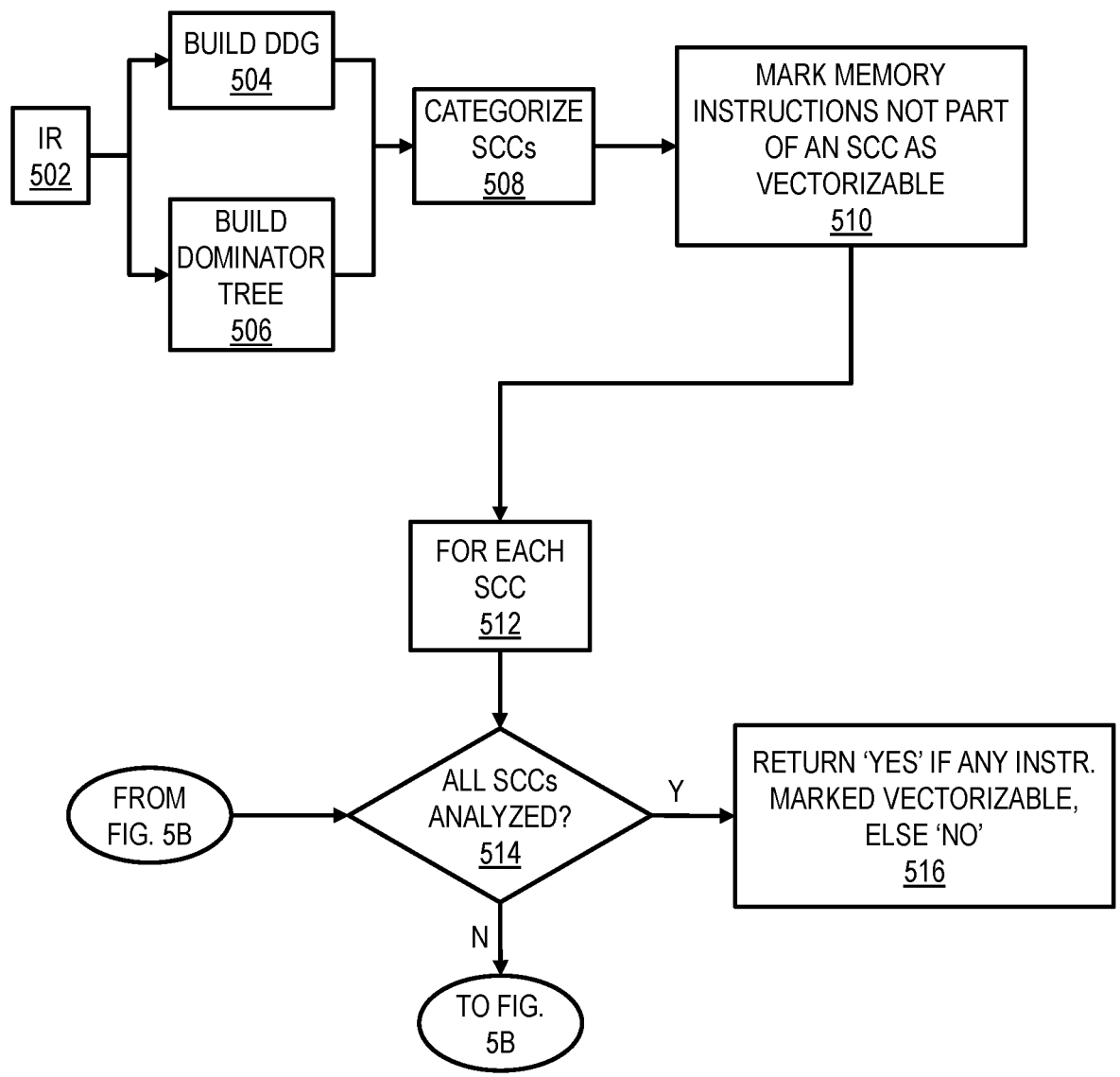
FIGS. 5A-5B depict a conceptual flow for control-dependent cross-iteration dependency analysis, in accordance with aspects described herein.
Figure 5B:
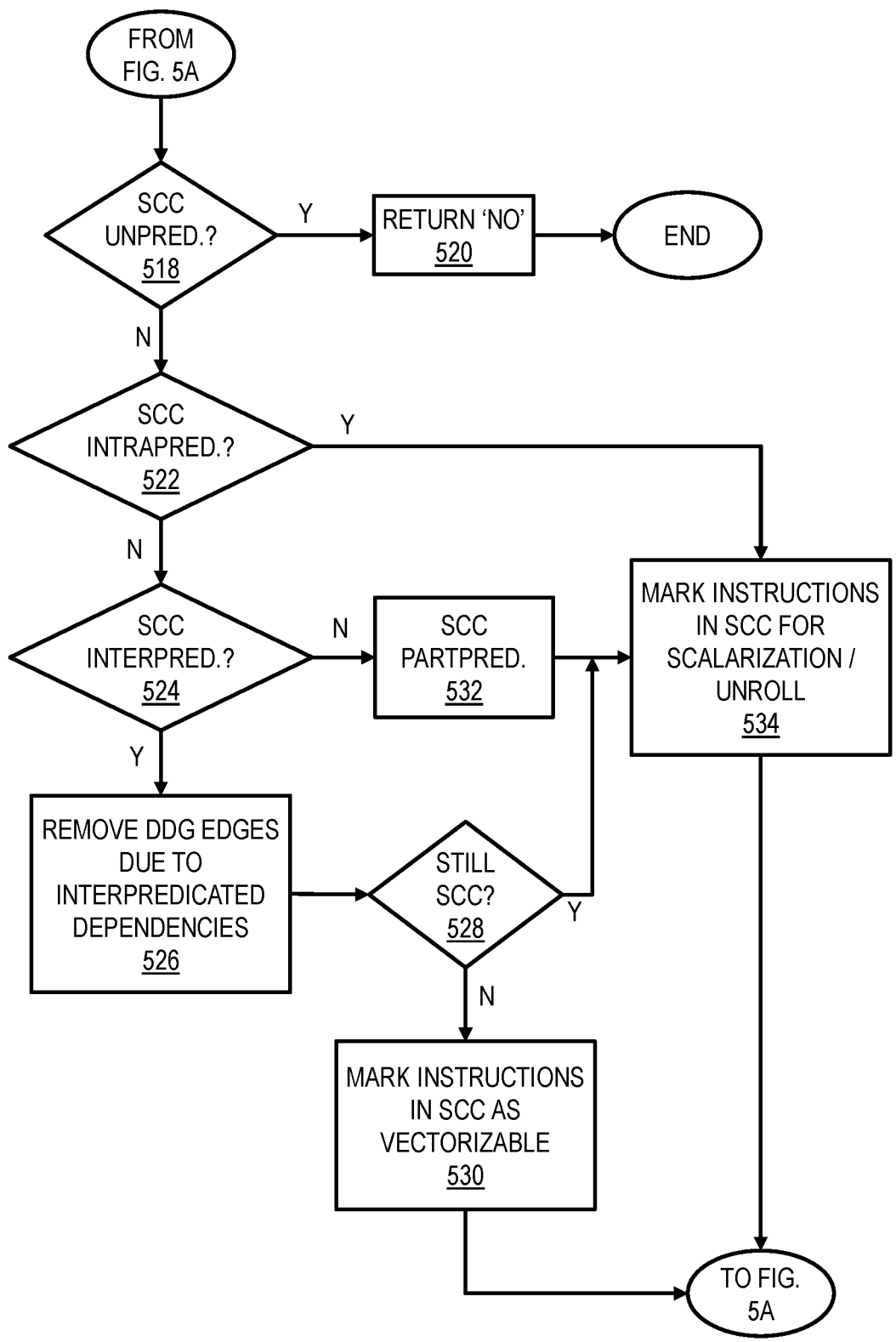

Using the above categorization scheme, aspects can further analyze the DDG and instructions contained in it as depicted by the example conceptual flow of FIGS. 5A-5B. The flow begins with input (502), which in this example is an Intermediate Representation (IR), i.e., a representation of the program semantics in a lower level of abstraction than the original program code. The compiler has parsed the user-provided program code and eventually represents it in IR form. The IR form might be fed to a mid-end optimizer, for instance, which would typically include vectorization as part of a larger set of optimizations that it performs. The flow proceeds by building the DDG (504) and Dominator tree (506). The Dominator Tree 506 is a tree data structure that represents aspects of the control flow, for example dominance relationships with respect to various basic blocks of a control flow graph (CFG). The dominance information is used to detect and categorize control dependencies, which could add edges to the dependence graph resulting in the creation of SCCs. With the built DDG and Dominator Trees, the flow can then categorize the SCCs (508) in the DDG. All instructions belonging to nodes that are not part of an SCC are marked vectorizable (510). The analysis then proceeds by (512) iterating for each of the SCCs in the DDG. For each of the SCCs, either of the following actions are taken (i) marking instructions in the SCC for scalarization/if-conversion, and (ii) removing edges due to InterPred dependencies. At 514 an inquiry is made as to whether all SCCs have been analyzed. If not (514, N), the process proceeds to FIG. 5B and inquires (518) whether all instructions of the SCC are in unpredicated blocks. If so (518, Y), the SCC is annotated as unpredicated indicating unpredicated dependency, which will return "no" (520) to disable vectorization directly (for instance, by leveraging a compiler's default legality analysis module). Otherwise (518, N), the flow proceeds by determining (522) whether the SCC is intrapredicated, i.e., in which all instructions are on the same control-path. If so (522, Y), the instructions in the SCC are marked for scalarization/unroll (534). Otherwise (522, N), the flow proceeds by determining (524) whether the SCC is interpredicated, i.e., in which the instructions are on different control-paths. If so (524, Y), the flow proceeds by removing DDG edge(s) (526). In the DDGs of FIGS. 4D, 4E, 4F, the arrows are edges, and removing an edge (imparting a uniformity guarantee) might mean there is no longer a cycle. If there is no cycle, then it can be vectorized. Thus, the flow then checks (528) whether an SCC still remains (i.e., as opposed to having broken the SCC). If removing an edge breaks up the SCC (528, N), then the instructions of the SCC are marked vectorizable (530). Otherwise (528, Y), they are marked for scalarization/unroll (534). If instead at 524 it is determined that the SCC is not interpredicated (524, N), then the SCC is partially predicated (532) and the flow continues by marking the instructions in the SCC for scalarization/unroll (534).

After marking the instructions vectorizable at 530 or making for scalarization/unroll at 534, the process proceeds by returning to FIG. 5A, specifically to determination 514 as to whether all SCCs have been analyzed. Once all SCCs have been analyzed (514, Y), the legality determination terminates (516) with an indication of whether any vectorizable instructions have been found, along with the markings indicating whether each instruction needs to be vectorized or scalarized.

Details of an example implementation of dependence analysis are explained using the following Algorithm 1 by way of example:

```
Input:   Data Dependence Graph G = (V,E)
         SCC_Set : a set of strongly connected components in G
Output:  scc_info: stores category information for strongly connected components
         in G
1:  for all scc ∈ SCC_Set do
2:    if all instructions in scc are not in predicated block then
3:      scc_info[scc] = UNPRED   // Unpredicated Dependency, which will
          disable Vectorization
4:      continue
5:    end if
6:    if all instructions in scc are dominated by the same branch instruction br then
7:      if all instruction in the same branch of br then   // Intra-Predicated
          Dependency
8:        scc_info[scc] = IntraPRED
9:      else         // Inter-Predicated Dependency
10:       scc_info[scc] = InterPRED
11:     end if
12:   else  // Partially-Predicated Dependency
13:     scc_info[scc] = PartPRED
14:   end if
15: end for
```

As discussed above, the dependence analysis is mainly about identifying which category the dependence information belongs in. Algorithm 1 above presents how the dependency analysis is performed based on the DDG. A process iterates through the SCCs, which are available from DDG directly, and performs the analysis shown in line 1 of Algorithm 1. First, if all instructions are in unpredicated blocks, the SCC is annotated as UNPRED indicating unpredicated dependency, which will disable vectorization directly, for instance through an old/default legality analysis module of the compiler, and in some examples through an existing default legality analysis module. Second, if any instructions in SCC are in predicated blocks, further analysis is performed by checking whether all of the instructions are dominated by the same branch instruction br (line 6 of Algorithm 1). In examples, this can be performed based on the Control Dependence Graph (CDG) or through the Dominator Tree directly. If some instructions are dominated by br and some are not, the SCC is annotated as PartPRED (line 13 of Algorithm 1), indicating the dependency exists across blocks which are not affected by one single branch instruction br. Otherwise, all the instructions are dominated by the same branch instruction br, and it is desired to determine whether or not the instructions are in the same control-path from br. If all instructions are on the same control-path, the SCC is annotated as IntraPRED to indicate Intra-Predicated Dependency. If the instructions are on different control-paths, the SCC is annotated as InterPRED to indicate Inter-Predicated Dependency. For all the different types of SCCs mentioned above, the process can, in examples, use its own legality analysis module, or, in examples, it can switch to an existing compiler's default legality analysis module that disables vectorization directly.

The uniformity-based analysis (306) also includes scalar evolution analysis (308) based on dynamic uniformity. Under this, a process utilizes dynamic uniformity information (assuming all lanes active or inactive) to perform scalar evolution analysis on uniform paths, as shown in FIG. 3. The scalar evolution analysis under the assumption of dynamic uniformity includes determining whether evolution of a scalar value based on instruction(s) in control-dependent blocks form a recurrence under condition of uniformity, and thus identify the vectorizable access pattern of the loop.

Scalar evolution analysis such as implemented in existing compilers aims to represent scalar values as a chain of recurrences that describe how a value changes over loop iterations. For example, an induction variable i starting from 0 and having stride 1 can be represented as the scalar evolution expression {0, +, 1} to indicate i increases by 1 at each iteration (also called an add recurrence). Stride information of induction variables is helpful for loop auto-vectorization because loads or stores can be directly vectorized if their access function is known to have a stride of 1 at compile-time. In general, the stride of control-dependent scalars cannot be analyzed at compile-time if the control flow depends on input data (such as in the example of FIG. 2A).

The fundamental issue with forming chains of recurrences to analyze stride for control-dependent scalars is that, from any iteration to the next, the stride may change. Thus, stride information is linked to control-dependence. If control flow information becomes known, in this case through run-time checks for uniformity, then it can be used at compile-time to determine exact stride information and find consecutive memory accesses for vectorization. In the example loop in FIG. 2A with the example input data set for above for the cond array, the variable j has a stride of only 1 between iterations 0 and 1 (the uniform-false region). Along the uniform-true and uniform-false paths, the value of the block predicate is known at compile-time. The scalar evolution analysis attempts to analyze how the variable(s) evolve along each uniform path and find consecutive memory accesses. If the block predicate is all false (uniform-false path), then j has the behavior {j, +, 1}, and the stride is exactly 1. Any memory accesses that use j as an access function can be vectorized in the uniform-false path. Without performing this analysis, such memory accesses must be scalarized because the compiler cannot determine the memory access pattern.

Details of an example implementation of uniformity-based scalar evolution analysis are explained using the following Algorithm 2 by way of example:

```
Input:   idx: an instruction that calculates a scalar describing a memory access
         pattern
         path p to analyze idx in, which is either Uniform-True, Uniform-False, or
         Divergent
Output:  SCEV: scalar evolution expression describing the scalar idx
 1:  return createSCEV(idx, p)
 2:  procedure createSCEV(instruction i, path p)
 3:     switch opcode(i) do
 4:        case Add
 5:           return getAddExpr(createSCEV(i.lhs), createSCEV(i.rhs))
 6:        case Phi
 7:           return createNodeForPHI(i, p)
 8:        case ...
 9:           // Some more sophisticated cases may be handled.
10:  end procedure
11:  procedure createNodeForPHI(phi, path p)
12:     // the unique incoming value (from outside the loop)
13:     Start ← incoming_value(phi)
14:     if p = Uniform-True then
15:        // the value added to the scalar on each iteration from the true path
16:        Accum ← value_from_path(true)
17:        return createAddRec(createSCEV(Start), createSCEV(Accum))
18:     else if p = Uniform-False then
19:        // the value added to the scalar on each iteration from the false path
20:        Accum ← value_from_path(false)
21:        return createAddRec(createSCEV(Start), createSCEV(Accum))
22:     else
23:        // The general (divergent) case
24:        return createAddRecFromPHI(phi)
25:     end if
26:  end procedure
```

Traditional scalar evolution analysis attempts to represent each scalar as a recurrence by analyzing how its value is derived across loop iterations. If a scalar is affected by a data-dependent condition, then its value may change unpredictably across loop iterations (depending on the input data). In accordance with aspects described herein, normal scalar evolution analysis is modified to reason about such scalars by providing information about the uniform-true and uniform-false paths. Uniformity-based scalar evolution analysis uses this information to determine how a scalar's value is derived based on whether it occurs in the uniform-true or uniform-false branch. Let br be the data-dependent branch instruction that all predicated blocks are dependent on. When analyzing how a scalar in the uniform-true branch is derived, br is considered as an unconditional branch to the true path. Similarly, when analyzing a scalar in the uniform-false path, br is considered as an unconditional branch to the false path. A scalar s that has a value derived from instructions in control-dependent blocks (on br) may form a recurrence when br is treated as unconditionally true or false. Algorithm 2 above shows a high-level description of how add-recurrences can be formed in uniform paths. For example, consider a scalar k which is initially 0 and updated by 1 when a condition is true (and otherwise unchanged), represented by the phi instruction i=φ(k+1, k). The query createSCEV (i, Uniform-True) will choose Start←0 (line 13) and Accum←1, because 1 is added to k along the true path. Therefore, the recurrence {0, +, 1} is formed, allowing a memory access pattern using k in the true path to be vectorized.

While opportunities for vectorization might exist for any given loop, it is not necessarily most efficient to vectorize the loop. As part of compiling program code, and in particular when compiling program code of a loop, a process can determine, based on results of the compile-time analysis discussed above and based further on an input execution profile of the program code input to a cost model, whether to vectorize the loop. In this latter regard, a probability-based cost model is presented to predict the most profitable strategy for auto-vectorization. Various factors are considered when estimating profitability, such as the overhead of performing run-time checks (the checks for dynamic uniformity), the benefit from the uniform branches, and the cost of performing the divergent path, which corresponds to a condition under which no dynamic uniformity is present. Aspects can use general profiling information, available from existing compilers for instance, to consider the impact of these factors and predict profitability.

Profile-Guided Optimization (PGO, also called feedback-directed optimizations or FDO) is a general technique that uses a program's execution profile to either expose new optimization opportunities not detected by static analysis, or to improve cost-benefit analysis. The exact profile information collected by different compilers may vary, but most compilers collect branch probabilities. Thus, an input execution profile can indicate probabilities of likelihood of the dynamically uniform conditions, including a probability that program code execution follows a uniform-true path of the loop and a probability that program code execution follows a uniform-false path of the loop, and a probability of likelihood of the condition under which no dynamic uniformity is present, in which the program code execution follows the divergent execution path of the loop. Based on a branch instruction br with probability p of the branch condition being true, which may be known from PGO information, each uniform and divergent path has different probability of being executed. Assuming that the condition of branch br is independent between iterations—for example, is not modified by instructions in the loop—the probability of executing the uniform-true path is $p^v$, where v is the vectorization factor (number of SIMD lanes). Symmetrically, the probability of executing the uniform-false path is $(1-p)^v$. The probability of executing the divergent branch is then $1-p^v-(1-p)^v$. These three probabilities correspond to the likelihood of each uniform-true (UT) path, uniform-false (UF) path, or divergent (DV) path being executed at run-time.

An example cost model incorporating this compile-time prediction is shown in Algorithm 3 as follows:

```
Input:    V F: The set of vectorization factors > 1
          P: The probability table, which contains the probability of a branch br
             condition being true
          R: The set of all branches with potentially dynamic uniform conditions
Output:   rt_check_decisions: a structure that stores the mapping ⟨br, vf⟩ → ⟨cost,
             decision⟩
          divergent_decisions: a structure that stores the mapping ⟨br, vf⟩ → ⟨cost,
             decision⟩
 1:   for all v ∈ V F do
 2:      for all branch instructions br ∈ R do
 3:         // Phase 1: find the minimum cost decision for the divergent path
 4:         p := P[br]
 5:         T, F := get_control_paths(br)
 6:         cost_CA := scalarize_cost(p, v, T, F)
 7:         cost_IF := ifconvert_cost(v, T ∪ F)
 8:         if cost_IF < cost_CA then
 9:            divergent_decisions[⟨br, v⟩)] := ⟨cost_IF, if-convert⟩
10:         else
11:            divergent_decisions[⟨br, v⟩] := ⟨cost_CA, scalarize⟩
12:         end if
13:         // Phase 2: determine profitability of the run-time check technique
14:         UT,UF := get_uniform_paths(br)
15:         cost_RT := rt_cost(p, v, UT, UF, divergent_decisions[⟨br, v⟩].first)
16:         if cost_RT < divergent_decisions[⟨br, v⟩].first then
17:            rt_check_decisions[⟨br, v⟩] := ⟨cost_RT, true⟩
18:         else
19:            rt_check_decisions[⟨br, v⟩] := ⟨divergent_decisions[⟨br, v⟩].first, false⟩
20:         end if
21:      end for
22:   end for
23:   // Phase 3: choose the minimum cost vectorization factor
24:   return select_vectorization_factor(rt_check_decisions)
```

Referring to Algorithm 3 above, Phase 1 of the cost model makes a decision for the divergent path that is a key-value mapping between a branch/vectorization factor pair (the key) and a vectorization decision/associated cost pair (the value), as shown in lines 9 and 11. If the divergent path does not contain any control-dependent cross-iteration dependency, then it can either be executed as vector code (through if-conversion) or scalar code. Scalarization may be more profitable than vectorization. For example, if the branch probability is low, vectorization using masked instructions will consequently have low lane utilization; scalar code may achieve better performance. Thus, branch probability is an important factor when deciding whether to vectorize or scalarize the divergent path.

For each candidate branch instruction br ∈ R, there is a set of blocks T∪F (line 5) that are control-dependent on the block terminated by br. The condition of branch instruction br is true with probability p (line 4). Let i be a scalar instruction inside a block B∈ T∪F, then seq (i) is the cost of instruction i. The function ifconv (v, i) (see Eq. 2 below) is the cost for the vector instruction sequence of scalar instruction i. The cost of a block B is the sum $\Sigma_{i \in B}$fn (i) of all instruction costs in B (where fn is seq or ifconv). The cost model calculates the cost of both scalarization and vectorization of the divergent path using the following equations:

$$\text{SCALARIZE\_COST}(p, v, T, F) = \sum_{B \in T} \sum_{i \in B} seq(i) \cdot v \cdot p + \sum_{B \in F} \sum_{i \in B} seq(i) \cdot v \cdot (1-p) \quad \text{(Eq. 1)}$$

$$\text{IFCONVERT\_COST}(v, T \cup F) = \sum_{B \in T \cup F} \sum_{i \in B} ifconv(v, i) \quad \text{(Eq. 2)}$$

As shown by Eq. 1, if the divergent path is scalarized with vectorization factor v, one scalar instance must be replicated for each SIMD lane, therefore the cost is first scaled by v. Then, the expected cost of each scalar instruction is calculated by scaling instruction cost based on the probability of execution, i.e., p for the true path and (1−p) for the false path.

If the divergent path is vectorized, each block will be executed unconditionally due to if-conversion and therefore the cost does not depend on p (see Eq. 2). The cost model uses Eq. 1 (line 6) and Eq. 2 (line 7) to compare (line 8) the costs of either scalarizing or vectorizing the divergent path. The decision with lowest cost is stored in divergent decisions as a mapping between branch instruction and vectorization factor to associated cost and decision (lines 9 and 11). If the divergent path contains a dependency, if-conversion is an illegal transformation and the associated cost is equal to infinity. This cost/decision pair is later used in Phase 2 to calculate the overall cost of applying the run-time check technique.

Phase 2 of the cost model makes a decision for run-time checks, estimating whether the run-time check technique will be profitable for each vectorization factor and branch instruction. The cost of the run-time check technique is divided into four components: uniform-true path cost, uniform-false path cost, divergent path cost, and the cost of detecting uniformity (run-time check overhead). A goal of phase 2 is to determine whether the benefits from uniform paths can amortize the run-time check overhead. The uniform and divergent path costs depend on the branch condition probability p. For example, if the divergent path is executed frequently, its cost may dominate and cause the run-time check technique to be unprofitable. The cost of a path s→t is the sum of all block costs b∈ s→t and is defined as pathcost (s→t). Let RT be the set of instructions that implement the run-time checks. These instructions are always executed (with probability p=1). Let UT be the uniform-true path, UF be the uniform-false path, and DV be the divergent path. Then, the total expected cost of the entire transformation is calculated as shown by Eq. 3 using costpv=divergent_decisions [ ⟨br, v⟩].first as input:

$$RT\_COST(p, v, UT, UF, cost_{DV}) = \sum_{i \in RT} seq(i) + pathcost(UT) \cdot p^v + pathcost(UF) \cdot (1-p)^v + cost_{DV} \cdot (1 - p^v - (1-p)^v) \quad \text{(Eq. 3)}$$

On line 16 of Algorithm 3, the cost model compares the total cost of the run-time check technique to the minimum divergent path cost, $cost_{DV}$, calculated in Phase 1. The run-time check technique is profitable if its cost is less than the best decision for the divergent path. Otherwise, the run-time check technique will not be applied for the current branch instruction and vectorization factor; instead, the decision from phase 1 is most profitable. This profitability decision is stored in the rt_check_decisions structure as a mapping between branch instruction and vectorization factor to associated cost and run-time check technique disabled/enabled (represented as a boolean value). Thus, Phase 2 determines the most profitable decision for all branch instruction/vectorization factor pairs.

By completion of Phases 1 and 2, the optimal decisions and associated costs for each branch instruction/vectorization factor pair are stored in the structures rt_check_decisions and divergent_decisions. Phase 3 selects the vectorization factor with the lowest cost for all branch instructions in the loop body as:

$$v_{opt} = \underset{v \in VF}{\operatorname{argmin}}\left(\sum_{b \in B} \text{rt\_check\_decisions}[\langle br, v\rangle].\text{first}\right) \quad \text{(Eq. 4)}$$

If the cost associated with $v_{opt}$ is less than the cost of the scalar loop, then vectorization is enabled. Once the loop is being transformed, decisions are recovered through the mappings defined in earlier phases. For example, the decision whether to enable run-time checks for branch instruction b with vectorization factor $v_{opt}$ is stored as rt_check_decisions [ ⟨br, $v_{opt}$⟩].second. The cost model can make individual decisions for each branch instruction within the loop body, in other words, the decision to enable or disable the run-time check technique is not global among all branch instructions. In other words, every branch represents possible cases uniform true, uniform false, or divergent. A potential transformation could thus be performed at that point for uniform true, uniform false, or divergent cases. In the subject loop being considered for vectorization, there might be several possible branches. A decision to vectorize or not is made for each of those branches. Some might have a relatively large predicated path and so vectorization may be more profitable. For others, it might not make sense to vectorize, and therefore it is scalarized. In cases where a given loop includes a plurality of branch instructions, a process can perform the profitability determination for each such branch instruction in conjunction with a plurality of different vectorization factors. Determining whether to vectorize the loop can include deciding for each such branch instruction whether to enable run-time checks and vectorize for that branch instruction. In addition, the profitability determination is made for different vectorization factors, and the determination whether to vectorize a loop identifies a most profitable vectorization factor to use for the loop, and further identifies whether to vectorize instructions of the divergent execution path, by the above.

Benefits of this cost model include that (i) it does not require special profiling or expensive auto-tuning, (ii) it is parameterized by vectorization factor, unlike conventional practice that collects profiling for each factor, and (iii) it is a high-level algorithm that can be easily adopted by other compilers and for different architectures.

Figure 6:
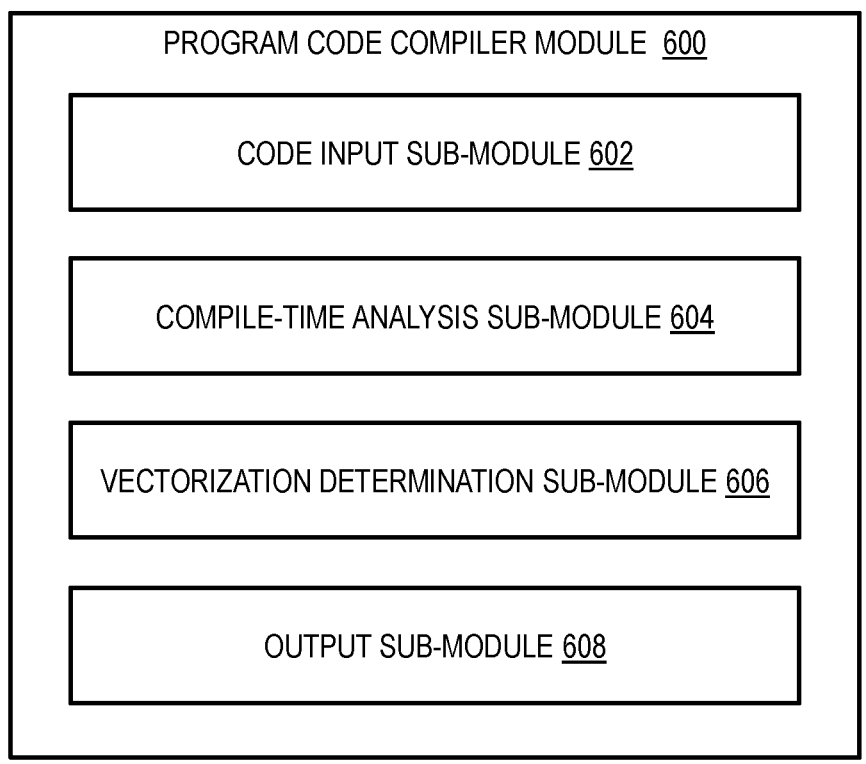
FIG. 6 depicts further details of an example program code compiler module to incorporate and/or use aspects described herein.

FIG. 6 depicts further details of an example program code compiler module (e.g., program code compiler module 600 of FIG. 1) to incorporate and/or use aspects described herein. In one or more aspects, program code compiler module 600) includes, in one example, various sub-modules to be used to perform auto-vectorization with run-time checks, as described herein. The sub-modules can be or include, e.g., computer readable program code (e.g., instructions) in computer readable media, e.g., persistent storage (e.g., persistent storage 113, such as a disk) and/or a cache (e.g., cache 121), as examples. The computer readable media may be part of a computer program product and may be executed by and/or using one or more computers or devices, and/or processor(s) or processing circuitry thereof, such as computer(s) 101, EUD 103, server 104, or computers of cloud 105/106 of FIG. 1, as examples.

Referring to FIG. 6, the program code compiler module 600 includes code input sub-module 602 for obtaining input program code, compile-time analysis sub-module 604 for performing compile-time analysis as described herein, for instance using a dependence analysis component and a scalar evolution analysis component, a vectorization determination sub-module 606 for determining whether to vectorize program code, for instance based on results of the compile-time analysis and further on an input execution profile of the program code, and using a profitability determination component, and an output sub-module 608 for outputting the compiled code for execution.

Figure 7:
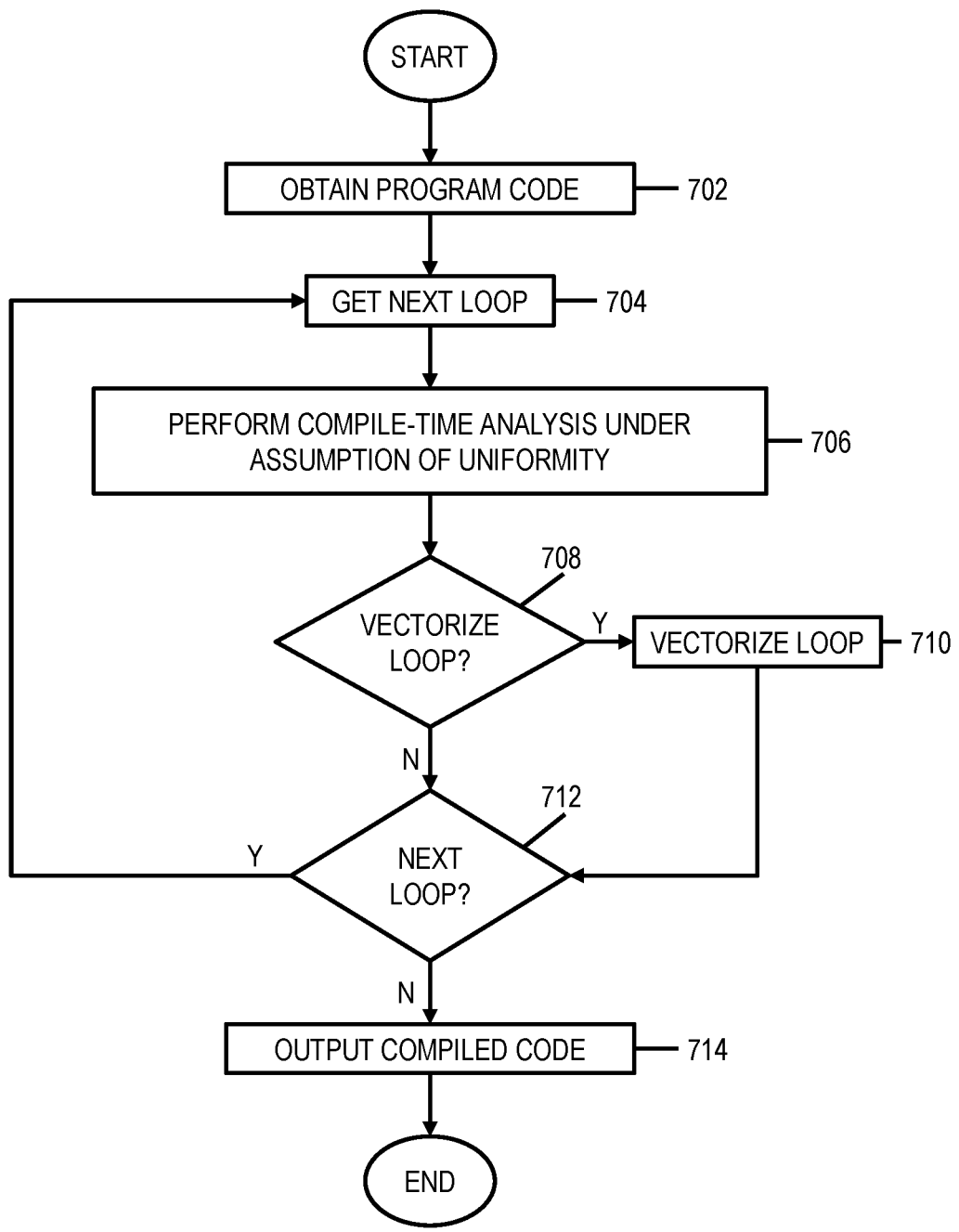
FIGS. 7-9 depict example processes for auto-vectorization with run-time checks in accordance with aspects described herein.
Figure 8:
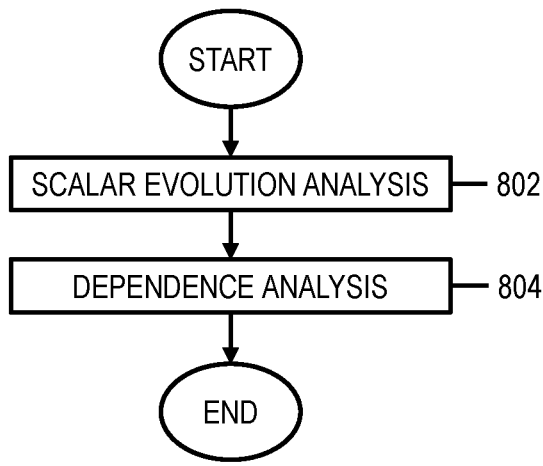
Figure 9:
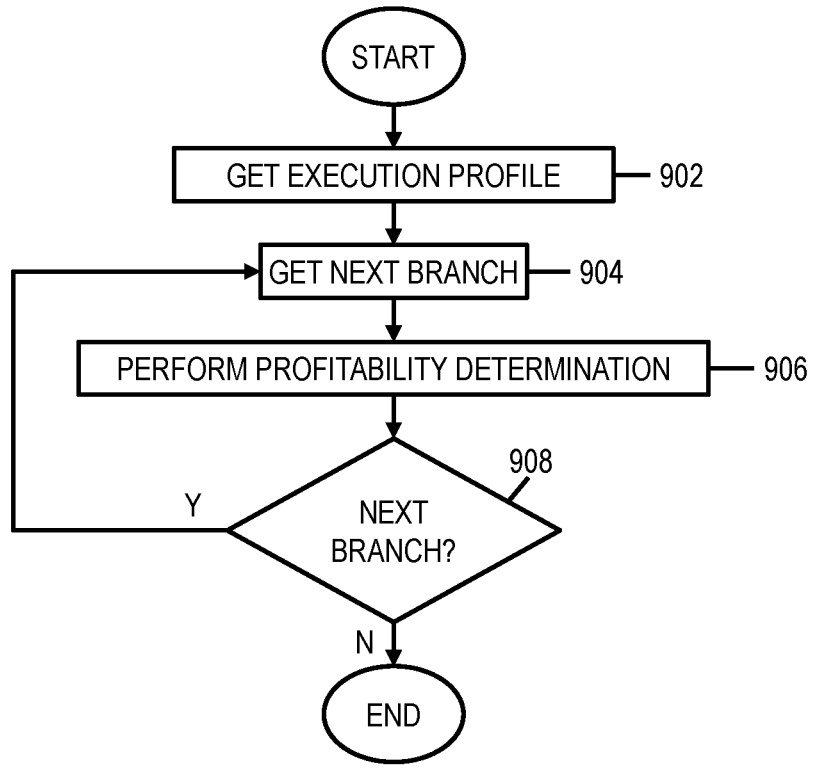

FIG. 7-9 depict example processes for auto-vectorization with run-time checks in accordance with aspects described herein. Processes may be executed, in one or more examples, by a processor or processing circuitry of one or more computers/computer systems, such as those described herein, and more specifically those described with reference to FIG. 1. In one example, code or instructions implementing the process(es) of FIGS. 7-9 are part of a module, such as module 600. In other examples, the code may be included in one or more modules and/or in one or more sub-modules of the one or more modules. Various options are available.

Referring initially to FIG. 7, the process obtains (702) program code to be compiled. The program code includes one or more loops, one or more of which include control-flow having divergent branch conditions. The process proceeds by compiling the program code to produce compiled code. As part of this compiling, the processing enters a loop that gets (704) a next loop of the program code. The process proceeds by performing (706) compile-time analysis of the loop based on an assumption of dynamic uniformity, and determines from the compile-time analysis a vectorizable access pattern of the loop.

FIG. 8 depicts an example of such compile-time uniformity-based analysis. Referring to FIG. 8, the compile-time analysis includes, and the process performs, scalar evolution analysis (802) and dependence analysis (804), both under the assumption of dynamic uniformity. In examples, the scalar evolution analysis (802) under the assumption of dynamic uniformity includes determining whether evolution of a scalar value based on one or more instructions in control-dependent blocks forms a recurrence under condition of uniformity, and thus identifies a vectorizable access pattern of the loop. In examples, the dependence analysis (804) under the assumption of dynamic uniformity identifies a control-dependent cross-iteration dependence as part of a strongly connected component (SCC) and a category of the control-dependent cross-iteration dependence. In examples, the category is selected as one from the group consisting of (i) an intra-predicated dependence, (ii) a partially-predicated dependence, and (iii) an inter-predicated dependence.

Referring back to FIG. 7, based on results of the compile-time analysis (706) and based further on an input execution profile of the program code (for instance input to a cost model) the process proceeds to 708 where it determines whether to vectorize the loop. An example process for determining whether to vectorize the loop is discussed with reference to FIG. 9. Referring to FIG. 9, the process gets (902) an execution profile of the program code (or at least the loop) as input. The input execution profile can indicate, for example, (i) probabilities of likelihood of the dynamically uniform conditions, including a probability that program code execution follows a uniform-true path of the loop and a probability that program code execution follows a uniform-false path of the loop, and (ii) a probability of likelihood of the condition under which no dynamic uniformity is present, in which the program code execution follows the divergent execution path of the loop. The process then enters a loop by obtaining (904) a next branch instruction of the program code loop, and performs (906) a profitability determination for that branch. The profitability determination can be performed by way of a cost model that accounts for (i) overhead associated with performing the run-time checks at run-time, (ii) a benefit of vectorizing the loop for vector processing under the dynamically uniform conditions, and (iii) a cost of a divergent execution path, of the loop, corresponding to a condition under which no dynamic uniformity is present. The profitability determination can be made for a plurality of different vectorization factors if present, with determination whether to vectorize the loop identifying a most profitable vectorization factor to use and whether to vectorize instructions of the divergent execution path. In scenarios in which the program code loop being analyzed for vectorization determination (708, FIG. 7) includers a plurality of branch instructions, the profitability determination can be performed for each such branch instruction, and in conjunction with different vectorization factors. Thus, based on performing the profitability determination (906) for the particular branch of an iteration, the process of FIG. 9 proceeds by determining (908) whether there is a next branch to process. If so (908, Y), the process returns to 904 to obtain the next branch and perform the profitability determination (906) for that next branch. Eventually, once the branches of the program code loop have been processed in this manner, the inquiry 908 will be answered in the negative (908, N) and the processing of FIG. 9 ends.

Thus, returning to FIG. 7, initially determining (708) whether to vectorize the loop can include deciding for each branch instruction whether to enable run-time checks and vectorize for that branch instruction. If at 708 it is determined to vectorize even just one of the branches, then it is determined to vectorize the loop (708, Y) and therefore the process performs the vectorizing (710) in accordance with aspects described herein to add run-time checks as described above. In examples, vectorizing the loop as part of the compiling the program code, including compiling the loop, includes providing run-time checks in the compiled code, the run-time checks configured for checking for dynamically uniform conditions for vector processing at run-time to control program execution flow based on a result of the checking. Additionally, the vectorizing selects which instructions of the loop to vectorize based, for instance, on an identified category of control-dependent cross-iteration dependence if present.

After vectorizing that loop, or if at 708 it is determined not to vectorize the loop (708, N), the process proceeds to determine (712) whether there is a next loop, of the obtained program code, to process. In some examples, the program code includes one or more additional loops, and therefore if there is a next loop (712, Y), the process repeats (by returning to 704 to obtain the next loop), for each additional loop, the compile-time analysis (706) of the loop based on the assumption of dynamic uniformity and the determining (708) whether to vectorize the loop. In this manner, based on iterating though the loops of the program code, additional loop of the program code may be selectively either vectorized or not vectorized, and this is the case independent of whether any other loop of the program code is vectorized.

Once the loops of the program code have been processed, there is no next loop (712, N) and the process outputs (714) the compiled code for execution.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:
1. A computer-implemented method comprising:
   obtaining program code to be compiled, the program code comprising a loop, and the loop comprising a control-flow having divergent branch conditions; and
   compiling the program code to produce compiled code, the compiling comprising:
      performing compile-time analysis of the loop based on an assumption of dynamic uniformity, and determining from the compile-time analysis a vectorizable access pattern of the loop; and
      vectorizing the loop as part of the compiling the program code, including compiling the loop, the vectorizing comprising:

providing run-time checks in the compiled code, the run-time checks configured for checking for dynamically uniform conditions for vector processing at run-time to control program execution flow based on a result of the checking; and outputting the compiled code for execution.

2. The computer-implemented method of claim 1, wherein the compiling the program code further comprises initially determining, based on results of the compile-time analysis and based further on an input execution profile of the program code, whether to vectorize the loop, wherein the vectorizing is performed based on initially determining to vectorize the loop.

3. The computer-implemented method of claim 2, wherein the determining whether to vectorize the loop comprises performing a profitability determination that accounts for (i) overhead associated with performing the run-time checks at run-time, (ii) a benefit of vectorizing the loop for vector processing under the dynamically uniform conditions, and (iii) a cost of a divergent execution path, of the loop, corresponding to a condition under which no dynamic uniformity is present.

4. The computer-implemented method of claim 3, wherein the input execution profile indicates (i) probabilities of likelihood of the dynamically uniform conditions, including a probability that program code execution follows a uniform-true path of the loop and a probability that program code execution follows a uniform-false path of the loop, and (ii) a probability of likelihood of the condition under which no dynamic uniformity is present, in which the program code execution follows the divergent execution path of the loop.

5. The computer-implemented method of claim 3, wherein the profitability determination is made for a plurality of different vectorization factors, and wherein the determining whether to vectorize the loop identifies a most profitable vectorization factor to use, and further identifies whether to vectorize instructions of the divergent execution path.

6. The computer-implemented method of claim 5, wherein the loop comprises a plurality of branch instructions, wherein the method performs the profitability determination for each branch instruction of the plurality branch instructions in conjunction with the plurality of different vectorization factors, wherein the initially determining whether to vectorize the loop comprises deciding for each branch instruction of the plurality of branch instructions whether to enable run-time checks and vectorize for that branch instruction.

7. The computer-implemented method of claim 2, wherein the program code comprises one or more additional loops, and wherein the method comprises repeating, for each additional loop of the one or more additional loops:
the performing compile-time analysis of the loop based on the assumption of dynamic uniformity; and
the initially determining whether to vectorize the loop;
wherein, based on the repeating, each additional loop of the one or more additional loops is selectively either vectorized or not vectorized, independent of whether any other loop of the program code is vectorized.

8. The computer-implemented method of claim 1, wherein the compile-time analysis of the loop comprises dependence analysis and scalar evolution analysis, both under the assumption of dynamic uniformity.

9. The computer-implemented method of claim 8, wherein the dependence analysis under the assumption of dynamic uniformity identifies a control-dependent cross-iteration dependence as part of a strongly connected component (SCC) and a category of the control-dependent cross-iteration dependence, the category being selected as one from the group consisting of (i) an intra-predicated dependence, (ii) a partially-predicated dependence, and (iii) an inter-predicated dependence, and wherein the vectorizing the loop selects which instructions of the loop to vectorize based on the identified category of the control-dependent cross-iteration dependence.

10. The computer-implemented method of claim 8, wherein the scalar evolution analysis under the assumption of dynamic uniformity comprises determining whether evolution of a scalar value based on one or more instructions in control-dependent blocks form a recurrence under condition of uniformity, and thus identify the vectorizable access pattern of the loop.

11. A computer system comprising:
a memory; and
a processor in communication with the memory, wherein the computer system is configured to perform a method comprising:
obtaining program code to be compiled, the program code comprising a loop, and the loop comprising a control-flow having divergent branch conditions; and
compiling the program code to produce compiled code, the compiling comprising:
performing compile-time analysis of the loop based on an assumption of dynamic uniformity, and determining from the compile-time analysis a vectorizable access pattern of the loop; and
vectorizing the loop as part of the compiling the program code, including compiling the loop, the vectorizing comprising:
providing run-time checks in the compiled code, the run-time checks configured for checking for dynamically uniform conditions for vector processing at run-time to control program execution flow based on a result of the checking; and
outputting the compiled code for execution.

12. The computer system of claim 11, wherein the compiling the program code further comprises initially determining, based on results of the compile-time analysis and based further on an input execution profile of the program code, whether to vectorize the loop, wherein the vectorizing is performed based on initially determining to vectorize the loop, and wherein the determining whether to vectorize the loop comprises performing a profitability determination that accounts for (i) overhead associated with performing the run-time checks at run-time, (ii) a benefit of vectorizing the loop for vector processing under the dynamically uniform conditions, and (iii) a cost of a divergent execution path, of the loop, corresponding to a condition under which no dynamic uniformity is present.

13. The computer system of claim 12, wherein the input execution profile indicates (i) probabilities of likelihood of the dynamically uniform conditions, including a probability that program code execution follows a uniform-true path of the loop and a probability that program code execution follows a uniform-false path of the loop, and (ii) a probability of likelihood of the condition under which no dynamic uniformity is present, in which the program code execution follows the divergent execution path of the loop, and wherein the profitability determination is made for a plurality of different vectorization factors, and wherein the determining whether to vectorize the loop identifies a most profitable vectorization factor to use, and further identifies whether to vectorize instructions of the divergent execution path.

14. The computer system of claim 11, wherein the compile-time analysis of the loop comprises dependence analysis and scalar evolution analysis, both under the assumption of dynamic uniformity.

15. The computer system of claim 14, wherein the dependence analysis under the assumption of dynamic uniformity identifies a control-dependent cross-iteration dependence as part of a strongly connected component (SCC) and a category of the control-dependent cross-iteration dependence, the category being selected as one from the group consisting of (i) an intra-predicated dependence, (ii) a partially-predicated dependence, and (iii) an inter-predicated dependence, and wherein the vectorizing the loop selects which instructions of the loop to vectorize based on the identified category of the control-dependent cross-iteration dependence.

16. The computer system of claim 14, wherein the scalar evolution analysis under the assumption of dynamic uniformity comprises determining whether evolution of a scalar value based on one or more instructions in control-dependent blocks form a recurrence under condition of uniformity, and thus identify the vectorizable access pattern of the loop.

17. A computer program product comprising:
a computer readable storage medium readable by a processing circuit and storing instructions for execution by the processing circuit to:
obtain program code to be compiled, the program code comprising a loop, and the loop comprising a control-flow having divergent branch conditions; and
compile the program code to produce compiled code, the compiling comprising:
perform compile-time analysis of the loop based on an assumption of dynamic uniformity, and determining from the compile-time analysis a vectorizable access pattern of the loop; and
vectorize the loop as part of the compiling the program code, including compiling the loop, the vectorizing comprising:
provide run-time checks in the compiled code, the run-time checks configured for checking for dynamically uniform conditions for vector processing at run-time to control program execution flow based on a result of the checking; and
output the compiled code for execution.

18. The computer program product of claim 17, wherein the instructions for execution by the processing circuit to compile the program code further comprise initially determining, based on results of the compile-time analysis and based further on an input execution profile of the program code, whether to vectorize the loop, wherein the vectorizing is performed based on initially determining to vectorize the loop, and wherein the determining whether to vectorize the loop comprises performing a profitability determination that accounts for (i) overhead associated with performing the run-time checks at run-time, (ii) a benefit of vectorizing the loop for vector processing under the dynamically uniform conditions, and (iii) a cost of a divergent execution path, of the loop, corresponding to a condition under which no dynamic uniformity is present.

19. The computer program product of claim 17, wherein the input execution profile indicates (i) probabilities of likelihood of the dynamically uniform conditions, including a probability that program code execution follows a uniform-true path of the loop and a probability that program code execution follows a uniform-false path of the loop, and (ii) a probability of likelihood of the condition under which no dynamic uniformity is present, in which the program code execution follows the divergent execution path of the loop, and wherein the profitability determination is made for a plurality of different vectorization factors, and wherein the determining whether to vectorize the loop identifies a most profitable vectorization factor to use, and further identifies whether to vectorize instructions of the divergent execution path.

20. The computer program product of claim 17, wherein the compile-time analysis of the loop further comprises dependence analysis and scalar evolution analysis, both under the assumption of dynamic uniformity, wherein the dependence analysis under the assumption of dynamic uniformity identifies a control-dependent cross-iteration dependence as part of a strongly connected component (SCC) and a category of the control-dependent cross-iteration dependence, the category being selected as one from the group consisting of (i) an intra-predicated dependence, (ii) a partially-predicated dependence, and (iii) an inter-predicated dependence, and wherein the vectorizing the loop selects which instructions of the loop to vectorize based on the identified category of the control-dependent cross-iteration dependence, and wherein the scalar evolution analysis under the assumption of dynamic uniformity comprises determining whether evolution of a scalar value based on one or more instructions in control-dependent blocks form a recurrence under condition of uniformity, and thus identify the vectorizable access pattern of the loop.

* * * * *